(12) United States Patent
Okabe et al.

(10) Patent No.: US 12,205,069 B2
(45) Date of Patent: Jan. 21, 2025

(54) INFORMATION PROCESSING APPARATUS, INFORMATION PROCESSING METHOD AND NON-TRANSITORY STORAGE MEDIUM

(71) Applicant: TOYOTA JIDOSHA KABUSHIKI KAISHA, Toyota (JP)

(72) Inventors: Kotaro Okabe, Ichikawa (JP); Mayuko Abe, Tokyo-to (JP); Satoshi Komamine, Nagoya (JP); Takeaki Dohda, Nagoya (JP); Ken Matsushita, Nagoya (JP); Yosuke Takada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 17/812,003

(22) Filed: Jul. 12, 2022

(65) Prior Publication Data
US 2023/0041023 A1 Feb. 9, 2023

(30) Foreign Application Priority Data

Aug. 6, 2021 (JP) ................................. 2021-129966

(51) Int. Cl.
*G06Q 10/0835* (2023.01)
*G05D 1/00* (2006.01)
*G06Q 10/047* (2023.01)
*G06Q 10/0832* (2023.01)

(52) U.S. Cl.
CPC ..... *G06Q 10/08355* (2013.01); *G05D 1/0027* (2013.01); *G06Q 10/047* (2013.01); *G06Q 10/0832* (2013.01)

(58) Field of Classification Search
CPC ........... G06Q 10/08355; G06Q 10/047; G06Q 10/0832; G06Q 10/083; G06Q 10/0833; G06Q 10/0837; G06Q 10/0838; G05D 1/0027; G05D 1/0291
See application file for complete search history.

(56) References Cited

U.S. PATENT DOCUMENTS

| | | | |
|---|---|---|---|
| 10,613,533 B1 * | 4/2020 | Payson | G05D 1/0088 |
| 11,222,299 B1 * | 1/2022 | Baalke | G01C 21/3691 |
| 11,263,579 B1 * | 3/2022 | Siegel | G06Q 10/0832 |

(Continued)

FOREIGN PATENT DOCUMENTS

WO 2018229871 A1 12/2018

OTHER PUBLICATIONS

Dekhne, Ashutosh, et al. "Automation in logistics: Big opportunity, bigger uncertainty." McKinsey Q 24 (2019). (Year: 2019).*

(Continued)

*Primary Examiner* — Emmett K. Walsh
(74) *Attorney, Agent, or Firm* — Dickinson Wright, PLLC (57) ABSTRACT

An information processing apparatus includes a controller, the controller being configured to select a first mobile body to deliver baggage to a delivery destination existing in a predetermined facility from among a plurality of types of delivery mobile bodies, wherein the controller selects the first mobile body, based on required time necessary to deliver the baggage to the delivery destination in a site of the predetermined facility, for each delivery mobile body.

3 Claims, 6 Drawing Sheets

(56) References Cited

U.S. PATENT DOCUMENTS

2020/0117217 A1      4/2020  Yuzawa et al.
2020/0393260 A1*    12/2020  Falck ............... G06Q 10/08355
2020/0401995 A1*    12/2020  Aggarwala ........ G06Q 10/0838

OTHER PUBLICATIONS

Homier, Valerie, et al. "Drone versus ground delivery of simulated blood products to an urban trauma center: The Montreal Medi-Drone pilot study." Journal of Trauma and Acute Care Surgery 90.3 (2021): 515-521. (Year: 2021).*

* cited by examiner

| FACILITY INFORMATION | | |
|---|---|---|
| FACILITY NAME | MAP INFORMATION | EQUIPMENT INFORMATION |
| APARTMENT BUILDING COMPLEX A | ... | ... |
| ... | ... | ... |

FIG.6

INFORMATION PROCESSING APPARATUS, INFORMATION PROCESSING METHOD AND NON-TRANSITORY STORAGE MEDIUM

CROSS REFERENCE TO THE RELATED APPLICATION

This application claims the benefit of Japanese Patent Application No. 2021-129966, filed on Aug. 6, 2021, which is hereby incorporated by reference herein in its entirety.

BACKGROUND

Technical Field

The present disclosure relates to a technology for delivering baggage using a plurality of types of mobile bodies.

Description of the Related Art

Patent Literature 1 discloses a delivery system for delivering an article using a mobile body. In the delivery system disclosed in Patent Literature 1, a first mobile body is specified as a delivery destination of the article. Furthermore, identification information or movement plan information about the first mobile body is provided for a second mobile body. Then, the second mobile body autonomously moves, destined for the first mobile body.

CITATION LIST

Patent Literature

Patent Literature 1: International Publication No. WO 2018/229871

SUMMARY

An aspect of the present disclosure is to provide a technology capable of selecting a mobile body used to deliver baggage from among a plurality of types of delivery mobile bodies.

An information processing apparatus according to a first aspect of the present disclosure includes a controller, the controller being configured to select a first mobile body to deliver baggage to a delivery destination existing in a predetermined facility from among a plurality of types of delivery mobile bodies, wherein the controller selects the first mobile body, based on required time necessary to deliver the baggage to the delivery destination in a site of the predetermined facility, for each delivery mobile body.

An information processing method according to a second aspect of the present disclosure is an information processing method executed by a computer, the method including selecting a first mobile body to deliver baggage to a delivery destination existing in a predetermined facility from among a plurality of types of delivery mobile bodies, wherein the first mobile body is selected based on required time necessary to deliver the baggage to the delivery destination in a site of the predetermined facility, for each delivery mobile body.

A non-transitory computer readable storing medium according to a third aspect of the present disclosure is a non-transitory storage medium storing a program, the program causing a computer to execute an information processing method, wherein the information processing method includes selecting a first mobile body to deliver baggage to a delivery destination existing in a predetermined facility from among a plurality of types of delivery mobile bodies; and the first mobile body is selected based on required time necessary to deliver the baggage to the delivery destination in a site of the predetermined facility, for each delivery mobile body.

According to the present disclosure, it is possible to select a mobile body used to deliver baggage from among a plurality of types of delivery mobile bodies.

DESCRIPTION OF THE EMBODIMENTS

An information processing apparatus according to the present disclosure is provided with a controller that selects a mobile body used to deliver baggage from among a plurality of types of delivery mobile bodies. Here, the plurality of types of delivery mobile bodies may include autonomously movable mobile bodies like a ground automatic guided vehicle (AGV), an underground AGV and a drone. The ground AGV is an AGV that travels on the ground. The underground AGV is an AGV that travels in an underground passage.

The controller selects a first mobile body to deliver baggage to a delivery destination that exists in a predetermined facility from among the plurality of types of delivery mobile bodies. Here, the predetermined facility is a facility that has a plurality of places that may be delivery destinations of baggage. The predetermined facility is, for example, an apartment building having a plurality of apartments or an office building having a plurality of offices. Further, the predetermined facility may be such a facility that a plurality of buildings are gathered in a site. When the baggage is delivered to the predetermined facility, any place in the predetermined facility is specified as the delivery destination.

It is possible to deliver the baggage to the delivery destination that exists in the predetermined facility using any of the plurality of types of delivery mobile bodies. However, a movement route for delivering the baggage to the delivery destination in the site of the predetermined facility also differs according to the type of the mobile body. Therefore, time required to move in the site of the predetermined facility at the time of delivering the baggage to the delivery destination also differs according to the type of the mobile body. As a result, required time necessary to deliver the baggage to the delivery destination in the site of the predetermined facility differs according to the type of the mobile body.

Therefore, the controller selects the first mobile body based on the required time necessary to deliver the baggage to the delivery destination in the site of the predetermined facility, for each delivery mobile body. Thereby, it is possible to select a delivery mobile body in consideration of efficiency of movement of each mobile body in the site of the predetermined facility. Therefore, it is possible to select a more suitable mobile body as the mobile body to deliver the baggage to the delivery destination that exists in the predetermined facility.

A specific embodiment of the present disclosure will be described below based on drawings. The sizes, materials and shapes of components described in the present embodiment, a relative arrangement of the components and the like are not intended to limit the technological range of the present disclosure only thereto unless otherwise stated.

Embodiment (Outline of System)

Figure 1:
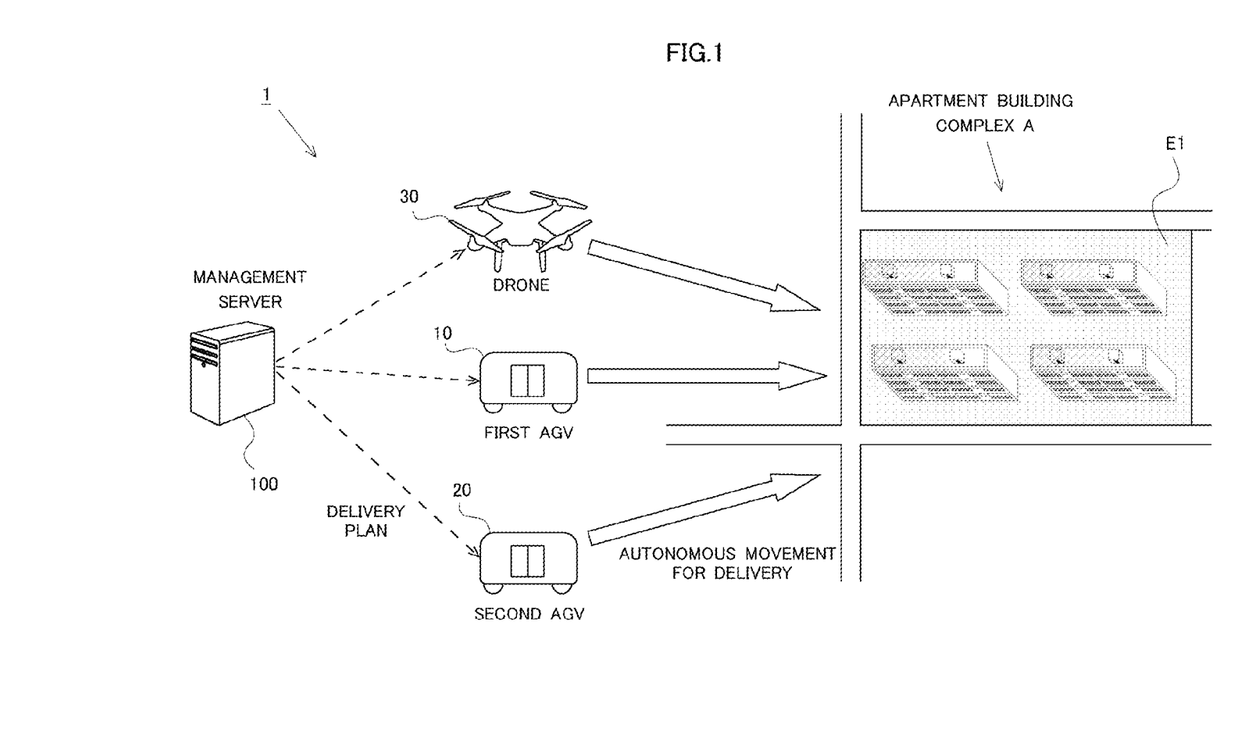
FIG. 1 is a first diagram for explaining a schematic configuration of a delivery management system and a delivery destination of baggage.
Figure 2:
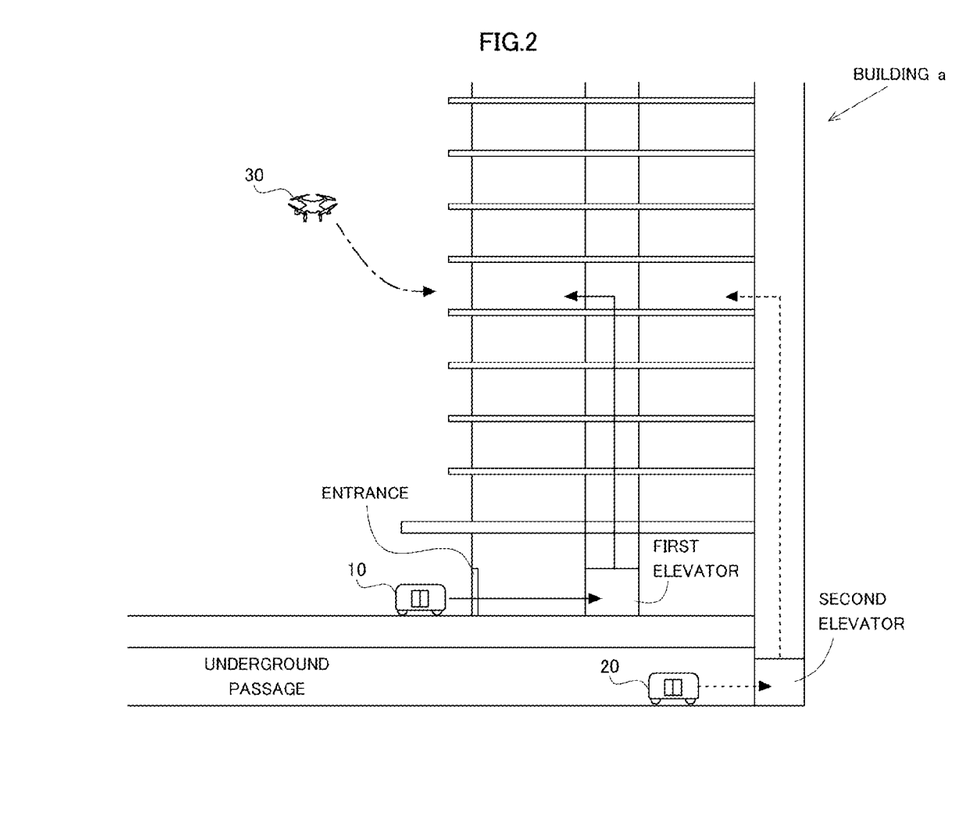
FIG. 2 is a second diagram for explaining the schematic configuration of the delivery management system and a delivery destination of baggage.
Figure 3:
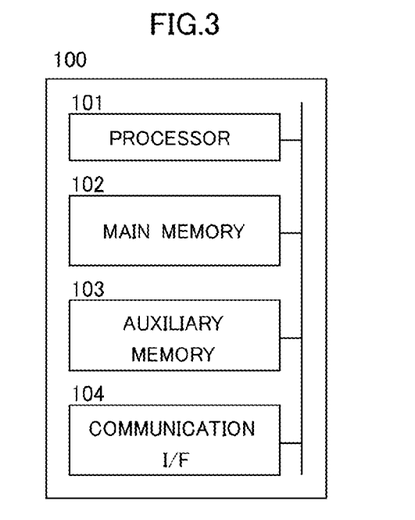
FIG. 3 is a block diagram schematically illustrating a hardware configuration of a management server.

A schematic configuration of a delivery management system according to the present embodiment and a delivery destination of baggage will be described based on FIGS. 1 to 3. FIG. 1 is a first diagram for explaining the schematic configuration of the delivery management system according to the present embodiment and a delivery destination of baggage. FIG. 2 is a second diagram for explaining the schematic configuration of the delivery management system and a delivery destination of baggage according to the present embodiment. FIG. 3 is a block diagram schematically illustrating a hardware configuration of a management server.

A delivery management system 1 is a system for delivering baggage to a delivery destination using a plurality of types of delivery mobile bodies. All of the plurality of types of delivery mobile bodies are autonomously movable mobile bodies. Specifically, the plurality of types of delivery mobile bodies according to the present embodiment are a first AGV 10, a second AGV 20 and a drone 30. The first AGV 10 is an AGV that travels on the ground. The second AGV 20 is an AGV that travels in an underground passage. The underground passage in which the second AGV 20 travels is a passage provided for travel of the second AGV 20. The drone 30 is an unmanned aerial vehicle capable of flying in a state of being loaded with baggage. The plurality of types of delivery mobile bodies are not limited to the above three types of mobile bodies.

As illustrated in FIG. 1, in the delivery management system 1, each of the first AGV 10, the second AGV 20 and the drone 30 is connected to a management server 100 via a network. As the network, a wide area network (WAN), which is a worldwide public communication network such as the Internet, or a telephone communication network for mobile phones and the like may be adopted. Each of the first AGV 10, the second AGV 20 and the drone 30 performs autonomous movement for baggage delivery based on a delivery plan transmitted from the management server 100.

The management server 100 is a computer for managing the first AGV 10, the second AGV 20 and the drone 30. As illustrated in FIG. 3, the computer constituting the management server 100 has a processor 101, a main memory 102, an auxiliary memory 103 and a communication interface (communication I/F) 104.

The processor 101 is, for example, a central processing unit (CPU) or a digital signal processor (DSP). The main memory 102 is, for example, a random access memory (RAM). The auxiliary memory 103 is, for example, a read-only memory (ROM), a hard disk drive (HDD) or a flash memory. As the auxiliary memory 103, a removable medium (portable storage medium) may be included. Here, the removable medium is, for example, a USB memory, an SD card or a disk recording medium like a CD-ROM, a DVD disk or a Blu-ray Disc. The communication I/F 104 is, for example, a LAN (local area network) interface board or a wireless communication circuit for wireless communication.

In the auxiliary memory 103, an operating system (OS), various kinds of programs, various kinds of information tables and the like are stored. By the processor 101 loading a program stored in the auxiliary memory 103 to the main memory 102 and executing the program, various controls for baggage delivery as described later is realized. However, a part or all of the functions in the management server 100 may be realized by a hardware circuit like an ASIC or an FPGA. The management server 100 does not necessarily have to be realized by a single physical configuration but may be configured by a plurality of computers cooperating with one another. In the present embodiment, the management server 100 corresponds to the "information processing apparatus" according to the present disclosure.

In the present embodiment, a scene of baggage being delivered to a delivery destination in an apartment building complex A is assumed as an example of a form of baggage delivery by the delivery management system 1. As illustrated in FIG. 1, the apartment building complex A is a facility that includes a plurality of buildings built in a predetermined site E1. On each floor of each building of the apartment building complex A, a plurality of apartments are included. The delivery management system 1 delivers baggage addressed to a resident of any apartment in the apartment building complex A by the first AGV 10, the second AGV 20 or the drone 30. However, a facility targeted by baggage delivery by the delivery management system 1 is not limited to an apartment building complex. For example, the delivery management system 1 can deliver baggage to an office building having a plurality of offices.

Here, description will be made on the structure and equipment of a building "a" constituting the apartment building complex A illustrated in FIG. 1 based on FIG. 2. The building "a" is provided with an entrance and a first elevator to be used by a person who is a resident or a visitor. Therefore, the resident or the visitor can enter the building "a" through the entrance and moves to each floor of the building "a" using the first elevator. In the case of delivering baggage to a delivery destination in the building "a" by the first AGV 10, the first AGV 10 can enter the building "a" through the entrance similarly to a person. Furthermore, the first AGV 10 can move to each floor of the building "a" using the first elevator. Solid-line arrows in FIG. 2 indicate an example of a movement route of the first AGV 10.

Further, below the predetermined site E1 where the apartment building complex A exists, an underground passage that communicates with the basement of each building is provided. The second AGV 20 can move in the predetermined site E1, traveling through the underground passage. The building "a" is provided with a second elevator that communicates with the underground passage. In the case of delivering baggage to a delivery destination in the building "a" by the second AGV 20, the second AGV 20 can get into the second elevator from the underground passage and move to each floor of the building "a" using the second elevator. Broken-line arrows in FIG. 2 indicate an example of a movement route of the second AGV 20.

In the case of delivering baggage to a delivery destination in the building "a" by the drone 30, the drone 30 can access each floor of the building "a" from the sky above the predetermined site E1. A long dashed short dashed line in FIG. 2 indicates an example of a movement route of the drone 30.

In the apartment building complex A, since each mobile body can move as described above, baggage can be delivered to each apartment on each floor of the building "a" by any of the first AGV 10, the second AGV 20 and the drone 30. Baggage does not necessarily have to be delivered to each apartment by the first AGV 10, the second AGV 20 or the drone 30. For example, delivery boxes for each mobile body may be installed for the building "a". In this case, each mobile body delivers baggage to a delivery box, with the delivery box as a delivery destination.

In the case of delivering baggage to a delivery destination in the apartment building complex A, the management server 100 selects any of the first AGV 10, the second AGV 20 and the drone 30 as the first mobile body used for the delivery. Furthermore, the management server 100 transmits a delivery plan for delivering the baggage to the first mobile body.

(Functional Configuration)

Figure 4:
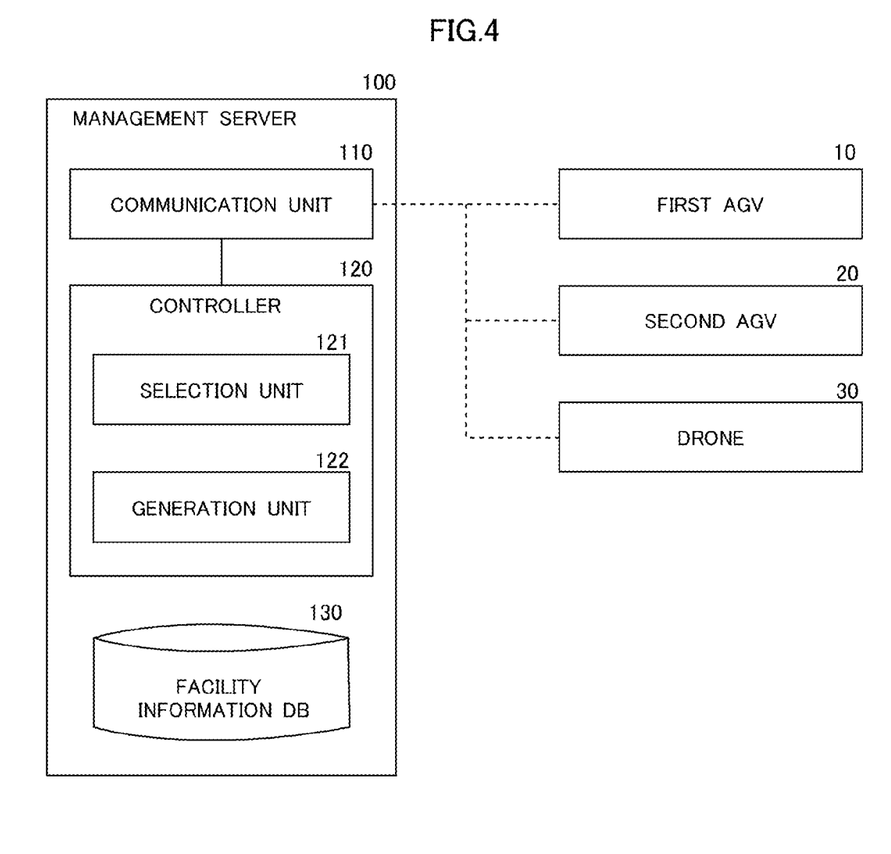
FIG. 4 is a block diagram schematically illustrating an example of a functional configuration of the management server.

Here, description will be made on a functional configuration of the management server 100 constituting the delivery management system 1 based on FIG. 4. FIG. 4 is a block diagram schematically illustrating an example of the functional configuration of the management server 100.

The management server 100 has a communication unit 110, a controller 120 and a facility information database (facility information DB) 130 as functional units. The communication unit 110 has a function of connecting the management server 100 to the network. The communication unit 110 can be realized by the communication I/F 104. The communication unit 110 can communicate with the first AGV 10, the second AGV 20 and the drone 30 via the network.

Figure 5:
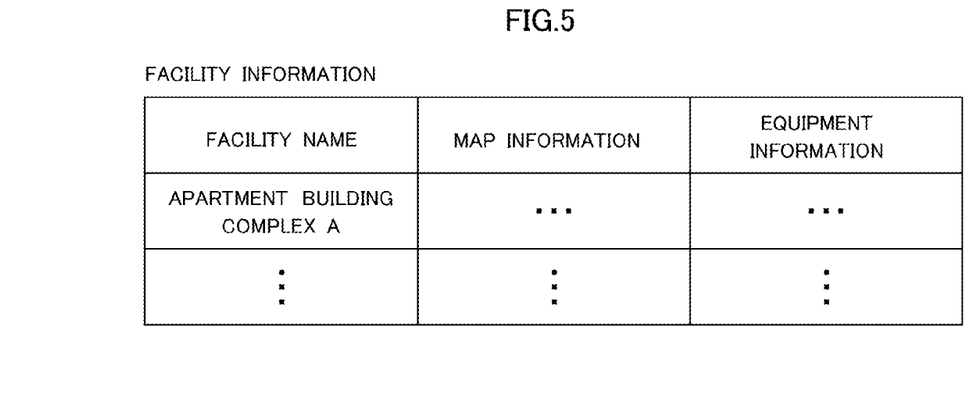
FIG. 5 is a diagram illustrating an example of a table configuration of facility information.

The controller 120 has a function of performing arithmetic processing for controlling the management server 100. The controller 120 can be realized by the processor 101. In the facility information DB 130, facility information about each facility that can be a target of baggage delivery by the delivery management system 1 is stored. For example, facility information about the apartment building complex A described above is stored in the facility information DB 130. FIG. 5 is a diagram illustrating an example of a table configuration of the facility information. As illustrate in FIG. 5, the facility information has facility name fields, map information fields and equipment information fields.

In each facility name field, the name of a facility is inputted. In each map information field, map information about the inside of the site of a facility is inputted. The map information includes information about a passage or area through which a person or each mobile body can pass in the site of the facility. Therefore, for example, the map information also includes information about an underground passage through which the second AGV 20 travels. Further, the map information includes position information about each section such as each apartment or each office that can be a delivery destination of baggage in the site of the facility. Further, as for map information about a facility where a plurality of delivery boxes that can be delivery destinations of baggage are installed, position information about each delivery box is included.

In each equipment information field, information about equipment that each of the first AGV 10, the second AGV 20, and the drone 30 can use at the time of delivering baggage in a facility (equipment information) is inputted. For example, for facility information about the apartment building complex A described above, the first elevator is inputted as equipment that the first AGV 10 can use, and the second elevator is inputted as equipment that the second AGV 20 can use.

The controller 120 of the management server 100 includes a selection unit 121 and a generation unit 122. The controller 120 acquires facility information about a predetermined facility, including a delivery destination of baggage, from the facility information DB 130. Then, the selection unit 121 selects the first mobile body to deliver the baggage from among the first AGV 10, the second AGV 20 and the drone 30 based on the acquired facility information. A method for selecting the first mobile body will be described later.

Then, the generation unit 122 generates a delivery plan for delivering the baggage by the first mobile body. At this time, the delivery plan is generated, with the mobile body selected by the selection unit 121 as the first mobile body. The controller 120 performs a process for transmitting, using the communication unit 110, the delivery plan generated by the generation unit 122 to the mobile body selected as the first mobile body. By the delivery plan being transmitted to the first mobile body from the management server 100, it becomes possible for the first mobile body to autonomously move based on the delivery plan to deliver the baggage.

The delivery plan includes information about a movement route for the first AGV 10, the second AGV 20 or the drone 30 to move from a start position for starting after being loaded with the baggage to the delivery destination. The information about the movement route includes not only the route from the start position of the first AGV 10, the second AGV 20 or the drone 30 to the predetermined facility where the delivery destination exists but also information about a movement route in the site of the predetermined facility.

(Flow of Information Processing)

Figure 6:
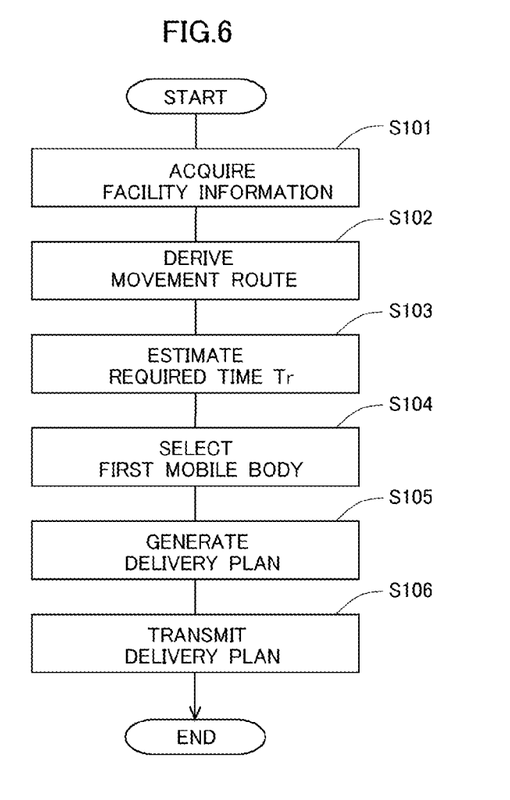
FIG. 6 is a flowchart illustrating a flow of information processing executed in the management server.

A flow of information processing executed by the management server 100 will be described below based on FIG. 6. FIG. 6 is a flowchart illustrating the flow of the information processing executed by the controller 120 of the management server 100.

In this flow, first, at S101, facility information about a predetermined facility including a delivery destination of baggage is acquired from the facility information DB 130. Next, at S102, for each of the first AGV 10, the second AGV 20 and the drone 30, a movement route to the delivery destination in the site of the predetermined facility is derived based on the facility information acquired at S101. The movement route of the first AGV 10 derived here includes a movement route on the ground in the site of the predetermined facility. The movement route of the second AGV 20 derived here includes a movement route below the site of the predetermined facility. The movement route of the drone 30 derived here includes a movement route in the sky above the site of the predetermined facility. Movement routes of the mobile bodies that move in the predetermined facility include movement routes in the predetermined facility.

Here, in the site of the predetermined facility, passages or areas through which the first AGV 10, the second AGV 20 and the drone 30 can pass differ according to the mobile bodies. Further, in the predetermined facility, pieces of equipment that the first AGV 10, the second AGV 20 and the drone 30 can use also differ according to the mobile bodies. Therefore, movement routes in the site of the predetermined facility differ according to the mobile bodies. Therefore, at S102, a movement route to the delivery destination in the site of the predetermined facility is derived for each mobile body based on map information and equipment information included in the facility information.

Next, at S103, for each of the first AGV 10, the second AGV 20 and the drone 30, required time Tr for delivering the baggage to the delivery destination in the site of the predetermined facility is estimated. At this time, the required time Tr for each mobile body is calculated based on the movement route in the site of the predetermined facility for the mobile body derived at S102. That is, the required time Tr for the first AGV 10 is estimated based on the movement route of the first AGV 10 in the site of the predetermined facility. The required time Tr for the second AGV 20 or the drone 30 is also similarly estimated.

Next, at S104, the first mobile body to deliver the baggage is selected from among the first AGV 10, the second AGV 20 and the drone 30. At this time, a mobile body with the shortest required time Tr estimated at S103, among the first AGV 10, the second AGV 20 and the drone 30, is selected as the first mobile body. The process from S102 to S104 is executed by the selection unit 121.

Next, at S105, a delivery plan for delivering the baggage to the delivery destination by the first mobile body selected at S104 is generated. The process of S105 is executed by the generation unit 122. Next, at S106, the delivery plan generated at S105 is transmitted to the first AGV 10, the second AGV 20 or the drone 30 selected as the first mobile body.

According to the above flow, in the case of delivering baggage to a delivery destination in a predetermined facility, a mobile body for which the required time Tr for delivering the baggage to the delivery destination in the site of the predetermined facility is the shortest among the first AGV 10, the second AGV 20 and the drone 30 is selected as the first mobile body. Thereby, it is possible to select a mobile body with the highest efficiency in movement in the site of a predetermined facility as the first mobile body. Therefore, it is possible to select a more favorable mobile body as a mobile body to deliver baggage to a delivery destination that exists in a predetermined facility.

In the delivery management system 1, a mobile body with the shortest required time Tr does not necessarily have to be selected as the first mobile body. For example, the first mobile body may be selected in consideration of the type of baggage to be delivered, in addition to the required time Tr for each mobile body. Further, when there are a plurality of pieces of baggage to be delivered to a predetermined facility, the first mobile body may be assigned to each of the pieces of baggage. In this case, assignment of the first mobile body may be decided based on the required time Tr for each mobile body and delivery priority of each piece of baggage.

Further, at the time of estimating the required time Tr for each mobile body, the required time Tr may be calculated in consideration of, in addition to the movement route of each mobile body in the site of a predetermined facility, the situation of each movement route and the situation of equipment that each mobile body uses on the movement route. For example, if a movement route of any mobile body is crowded with people or other mobile bodies, the required time Tr for the mobile body that moves on the movement route may be calculated longer. As for information indicating the situation of each movement route and the situation of the equipment that each mobile body uses on its movement route, the management server 100 may receive the information from a facility server that manages the predetermined facility via the network.

In the above embodiment, all of the plurality of types of delivery mobile bodies in the delivery management system 1 are assumed to be autonomously movable mobile bodies. However, the plurality of types of delivery mobile bodies may include a vehicle driven by a driver (a driver vehicle). When baggage is delivered to a delivery destination of a facility, for example, like the apartment building complex A by such a driver vehicle, the driver gets off the driver vehicle near the entrance of the facility. It is conceivable that the driver delivers the baggage to the delivery destination in the facility on foot. In such a case, the required time Tr for the driver vehicle is estimated in consideration of both of movement of the driver vehicle in the site of the facility and movement of the driver on foot in the facility.

Other Embodiments

The embodiment described above is a mere example, and the present disclosure can be appropriately changed and practiced within a range not departing from the spirit of the disclosure. The processes and means described in the present disclosure can be freely combined and implemented as long as a technical contradiction does not occur.

Further, a process described as being performed by one apparatus may be shared and executed by a plurality of apparatuses. Alternatively, processes described as being performed by different apparatuses may be executed by one apparatus. In a computer system, by what hardware configuration (server configuration) each function is realized can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium that can be connected to the system bus of the computer or may be provided for the computer via a network. As the non-transitory computer-readable storage medium, for example, any type of disk, such as a magnetic disk (a floppy (registered trademark) disk, a hard disk drive (HDD) and the like) and an optical disk (a CD-ROM, a DVD disk, a Blu-ray Disc and the like), and any type of medium suitable for storing electronic instructions, like a read-only memory (ROM), a random access memory (RAM), an EPROM, an EEPROM, a magnetic card, a flash memory or an optical card are included.

What is claimed is:
1. An information processing system comprising:
a plurality of delivery mobile bodies; and
an information processing apparatus comprising a communication interface, a memory and a controller, wherein
the plurality of delivery mobile bodies include a ground (automatic guided vehicle) AGV that travels on the ground, an underground AGV that travels in an underground passage and an autonomously movable drone,
map information about an inside of a site of a predetermined facility, the map information including information about a passage or area through which each delivery mobile body of the plurality of delivery mobile bodies can pass in the site of the predetermined facility, the passage or area including the underground passage through which the underground AGV travels, and information about equipment that each delivery mobile body of the plurality of delivery mobile bodies can use in the site of the predetermined facility are stored in the memory, and the controller is configured to:

acquire the map information and the information about equipment from the memory;

derive a first movement route of the ground AGV to a delivery destination in the site of the predetermined facility based on the map information and the information about equipment, the first movement route including a movement route on the ground in the site of the predetermined facility and the delivery destination existing in the site of the predetermined facility;

derive a second movement route of the underground AGV to the delivery destination in the site of the predetermined facility based on the map information and the information about equipment, the second movement route including a movement route below the site of the predetermined facility;

derive a third movement route of the drone to the delivery destination in the site of the predetermined facility based on the map information and the information about equipment, the third movement route including a movement route in the sky above the site of the predetermined facility;

receive, using the communication interface from a server which manages the predetermined facility, a situation of the first movement route, a situation of the second movement route, a situation of the third movement route, a situation of equipment that the ground AGV uses on the first movement route, a situation of equipment that the underground AGV uses on the second movement route, and a situation of equipment that the drone uses on the third movement route, each of the situations of the movement routes including a crowded situation on the passage or area, and each of the situations of the equipment including a crowded situation at the equipment;

calculate a first required time necessary for the ground AGV to deliver a baggage to the delivery destination in the site of the predetermined facility based on the first movement route, the situation of the first movement route and the situation of the equipment that the ground AGV uses;

calculate a second required time necessary for the underground AGV to deliver the baggage to the delivery destination in the site of the predetermined facility based on the second movement route, the situation of the second movement route and the situation of the equipment that the underground AGV uses;

calculate a third required time necessary for the drone to deliver the baggage to the delivery destination in the site of the predetermined facility based on the third movement route, the situation of the third movement route and the situation of the equipment that the drone uses;

select, as a first mobile body to deliver the baggage to the delivery destination, a mobile body with the shortest required time necessary to deliver the baggage to the delivery destination from among the ground AGV, the underground AGV and the drone based on the first required time, the second required time and the third required time;

transmit, using the communication interface, a delivery plan for delivering the baggage to the mobile body selected as the first mobile body among the ground AGV, the underground AGV and the drone;

receive the delivery plan from the information processing apparatus;

perform, by the selected first mobile body, an autonomous delivery of the baggage to the delivery destination based on the received delivery plan; and the delivery plan including a movement route of the first mobile body to the delivery destination and the movement route of the first mobile body being any one of the first movement route, the second movement route and the third movement route.

2. An information processing method executed by a computer in an information processing system including a plurality of delivery mobile bodies and the computer, the computer including a communication interface and a memory, wherein the plurality of delivery mobile bodies include a ground (automatic guided vehicle) AGV that travels on the ground, an underground AGV that travels in an underground passage and an autonomously movable drone, map information about an inside of a site of a predetermined facility, the map information including information about a passage or area through which each delivery mobile body of the plurality of delivery mobile bodies can pass in the site of the predetermined facility, the passage or area including the underground passage through which the underground AGV travels, and information about equipment that each delivery mobile body of the plurality of delivery mobile bodies can use in the site of the predetermined facility are stored in the memory, and the information processing method comprises:

acquiring the map information and the information about equipment from the memory;

deriving a first movement route of the ground AGV to a delivery destination in the site of the predetermined facility based on the map information and the information about equipment, the first movement route including a movement route on the ground in the site of the predetermined facility and the delivery destination existing in the site of the predetermined facility;

deriving a second movement route of the underground AGV to the delivery destination in the site of the predetermined facility based on the map information and the information about equipment, the second movement route including a movement route below the site of the predetermined facility;

deriving a third movement route of the drone to the delivery destination in the site of the predetermined facility based on the map information and the information about equipment, the third movement route including a movement route in the sky above the site of the predetermined facility;

receiving, using the communication interface from a server which manages the predetermined facility, a situation of the first movement route, a situation of the second movement route, a situation of the third movement route, a situation of equipment that the ground AGV uses on the first movement route, a situation of equipment that the underground AGV uses on the second movement route, and a situation of equipment that the drone uses on the third movement route, each of the situations of the movement routes including a crowded situation on the passage or area, and each of the situations of the equipment including a crowded situation at the equipment;

calculating a first required time necessary for the ground AGV to deliver a baggage to the delivery destination in the site of the predetermined facility based on the first movement route, the situation of the first movement route and the situation of the equipment that the ground AGV uses;

calculating a second required time necessary for the underground AGV to deliver the baggage to the delivery destination in the site of the predetermined facility based on the second movement route, the situation of the second movement route and the situation of the equipment that the underground AGV uses;

calculating a third required time necessary for the drone to deliver the baggage to the delivery destination in the site of the predetermined facility based on the third movement route, the situation of the third movement route and the situation of the equipment that the drone uses;

selecting as a first mobile body to deliver the baggage to the delivery destination, a mobile body with the shortest required time necessary to deliver the baggage to the delivery destination from among the ground AGV, the underground AGV and the drone based on the first required time, the second required time and the third required time;

transmitting, using the communication interface, a delivery plan for delivering the baggage to the mobile body selected as the first mobile body among the ground AGV, the underground AGV and the drone;

receiving the delivery plan from the information processing apparatus;

performing, by the selected first mobile body, an autonomous delivery of the baggage to the delivery destination based on the received delivery plan; and the delivery plan including a movement route of the first mobile body to the delivery destination and the movement route of the first mobile body being any one of the first movement route, the second movement route and the third movement route.

3. A non-transitory storage medium storing a program, the program causing a computer in an information processing system to execute an information processing method, the information processing system including a plurality of delivery mobile bodies and the computer, and the computer including a communication interface and a memory, wherein the plurality of delivery mobile bodies include a ground (automatic guided vehicle) AGV that travels on the ground, an underground AGV that travels in an underground passage and an autonomously movable drone, map information about an inside of a site of a predetermined facility, the map information including information about a passage or area through which each delivery mobile body of the plurality of delivery mobile bodies can pass in the site of the predetermined facility, the passage or area including the underground passage through which the underground AGV travels, and information about equipment that each delivery mobile body of the plurality of delivery mobile bodies can use in the site of the predetermined facility are stored in the memory, and the information processing method comprises:

acquiring the map information and the information about equipment from the memory;

deriving a first movement route of the ground AGV to a delivery destination in the site of the predetermined facility based on the map information and the information about equipment, the first movement route including a movement route on the ground in the site of the predetermined facility and the delivery destination existing in the site of the predetermined facility;

deriving a second movement route of the underground AGV to the delivery destination in the site of the predetermined facility based on the map information and the information about equipment, the second movement route including a movement route below the site of the predetermined facility;

deriving a third movement route of the drone to the delivery destination in the site of the predetermined facility based on the map information and the information about equipment, the third movement route including a movement route in the sky above the site of the predetermined facility;

receiving, using the communication interface from a server which manages the predetermined facility, a situation of the first movement route, a situation of the second movement route, a situation of the third movement route, a situation of equipment that the ground AGV uses on the first movement route, a situation of equipment that the underground AGV uses on the second movement route, and a situation of equipment that the drone uses on the third movement route, each of the situations of the movement routes including a crowded situation on the passage or area, and each of the situations of the equipment including a crowded situation at the equipment;

calculating a first required time necessary for the ground AGV to deliver a baggage to the delivery destination in the site of the predetermined facility based on the first movement route, the situation of the first movement route and the situation of the equipment that the ground AGV uses;

calculating a second required time necessary for the underground AGV to deliver the baggage to the delivery destination in the site of the predetermined facility based on the second movement route, the situation of the second movement route and the situation of the equipment that the underground AGV uses;

calculating a third required time necessary for the drone to deliver the baggage to the delivery destination in the site of the predetermined facility based on the third movement route, the situation of the third movement route and the situation of the equipment that the drone uses;

selecting as a first mobile body to deliver the baggage to the delivery destination, a mobile body with the shortest required time necessary to deliver the baggage to the delivery destination from among the ground AGV, the underground AGV and the drone based on the first required time, the second required time and the third required time; and transmitting, using the communication interface, a delivery plan for delivering the baggage to the mobile body selected as the first mobile body among the ground AGV, the underground AGV and the drone;

receiving the delivery plan from the information processing apparatus;

performing, by the selected first mobile body, an autonomous delivery of the baggage to the delivery destination based on the received delivery plan; and the delivery plan including a movement route of the first mobile body to the delivery destination and the movement route of the first mobile body being any one of the first movement route, the second movement route and the third movement route.

* * * * *